United States Patent [19]
Kushi et al.

[11] Patent Number: 5,376,500
[45] Date of Patent: Dec. 27, 1994

[54] POLYESTER RESIN FOR A DYE RECEPTIVE LAYER OF A RECORDING MEDIUM FOR SUBLIMATION TYPE HEAT-SENSITIVE TRANSFER RECORDING PROCESS, AND A RECORDING MEDIUM USING THE POLYESTER RESIN

[75] Inventors: Kenji Kushi; Takayuki Iseki; Tadayuki Fujiwara; Kazuhiko Jufuku; Akifumi Ueda, all of Hiroshima; Hitoshi Iwasaki; Youichi Nagai, both of Aichi, all of Japan

[73] Assignee: Mitsubishi Rayon Co., Ltd., Tokyo, Japan

[21] Appl. No.: 159,940

[22] Filed: Dec. 1, 1993

Related U.S. Application Data

[63] Continuation of Ser. No. 35,807, Mar. 23, 1993, abandoned.

[30] Foreign Application Priority Data

Mar. 24, 1992 [JP] Japan ................... 4-066406
Aug. 25, 1992 [JP] Japan ................... 4-226258
Nov. 17, 1992 [JP] Japan ................... 4-307364

[51] Int. Cl.$^5$ ............ G03C 8/00; C08F 20/00
[52] U.S. Cl. ................... 430/222; 528/272; 528/298; 528/302; 528/307; 528/308; 528/308.6; 430/199; 430/211; 430/531; 430/533; 525/445; 428/482
[58] Field of Search ........... 528/272, 298, 302, 307, 528/308, 308.6; 430/199, 211, 222, 531, 533; 525/445; 428/482

[56] References Cited

U.S. PATENT DOCUMENTS

| | | | |
|---|---|---|---|
| 4,297,432 | 10/1981 | Bowman et al. | 430/215 |
| 4,379,039 | 4/1988 | Fujimoto et al. | 204/159.15 |
| 4,713,365 | 12/1987 | Harrison | 503/227 |
| 4,727,057 | 2/1988 | Harrison et al. | 503/227 |
| 4,734,480 | 3/1988 | Kotera et al. | 528/49 |
| 5,178,952 | 1/1993 | Yamamoto et al. | 428/425.8 |

FOREIGN PATENT DOCUMENTS

| | | |
|---|---|---|
| 0364900 | 4/1990 | European Pat. Off. |
| 0464921 | 1/1992 | European Pat. Off. |
| 0475633 | 3/1992 | European Pat. Off. |

*Primary Examiner*—Samuel A. Acquah
*Attorney, Agent, or Firm*—Oblon, Spivak, McClelland, Maier & Neustadt

[57] ABSTRACT

A polyester resin for a dye receptive layer of a recording medium for sublimation type heat-sensitive transfer recording process, and a recording medium using thereof, which has superior resistance to light exposure and dark fade out. A polyester resin for a dye receptive layer of a recording medium for sublimation type heat-sensitive transfer recording process, wherein said polyester resin is formed by using a diol component containing a diol compound shown in Formula (1) in a range of 5-80 molar % with respect to the total diol component, and a receiving medium using thereof.

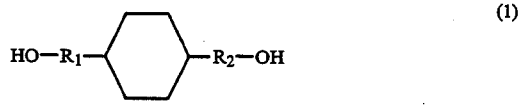

(1)

(In Formula (1), each of $R_1$ and $R_2$ represents an alkylene group having a number of carbon atoms within a range of 1-12.)

21 Claims, 1 Drawing Sheet

FIG.1

POLYESTER RESIN FOR A DYE RECEPTIVE LAYER OF A RECORDING MEDIUM FOR SUBLIMATION TYPE HEAT-SENSITIVE TRANSFER RECORDING PROCESS, AND A RECORDING MEDIUM USING THE POLYESTER RESIN

This is a continuation of application Ser. No. 08/035,807, filed Mar. 23, 1993, now abandoned.

BACKGROUND OF THE INVENTION

1. Field of the Invention

The present invention relates to a polyester resin for a dye receptive layer of a recording medium for sublimation type heat-sensitive transfer recording process, and a recording medium using the polyester resin.

2. Background Art

Sublimation type heat-sensitive transfer recording process are advantageous in that the level of noise produced during recording is low, the apparatus used therefor is small and inexpensive, the maintenance thereof is easy, and the output time is short. Furthermore, since sublimation type dyes are used, by continuously varying the amounts of the exothermic energy, high contrast recording may be easily achieved, and such recording exhibits high density and high resolution. As a result, in comparison with other recording methods, such a method is advantageous, especially for producing full color hard copy, and has been adopted as a recording method for color printers, video printers, and the like.

However, as the image recorded by using such a conventional recording medium for a sublimation type heat-sensitive transfer recording process has a wrong storage stability, this is disadvantageous in that fade out and discoloration resulting from sunlight or fluorescent light exposure occurs easily, and that blurring occurs additionally to the fade out and discoloration resulting from long storage under a condition of high temperature and high humidity.

SUMMARY OF THE INVENTION

It is an object of the present invention to obtain a polyester resin for a dye receptive layer of a recording medium for sublimation type heat-sensitive transfer recording process, and to obtain a recording medium using the polyester resin which can provide an image recorded thereon having good storage stability, that is to say, superior resistance to light exposure and dark fade out.

The recording medium for sublimation type heat-sensitive transfer recording process according to the present invention has a dye receptive layer including a polyester resin which is formed by using a diol component containing a diol compound shown in Formula (1) below in a range of 5-80 molar % with respect to the total diol component.

(1)

(In Formula (1), each of $R_1$ and $R_2$ represents an alkylene group having a number of carbon atoms within a range of 1-12.)

Thus obtained recording medium for a sublimation type heat-sensitive transfer recording process has the polyester resin which is formed by using the diol compound shown in Formula (1) above as a dyeable component. Accordingly, it has a good storage stability, that is to say, superior resistance to light exposure and dark fade out, so that it is difficult that fade out and discoloration resulting from sunlight or fluorescent light exposure, and fade out, discoloration and blurring resulting from long storage under high temperature and high humidity occur.

DETAILED DESCRIPTION OF THE INVENTION

Figure 1:
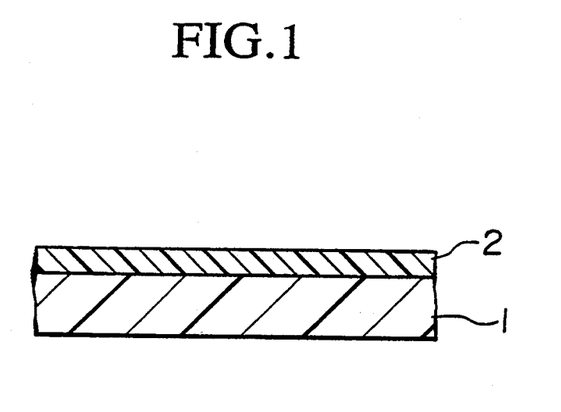
FIG. 1 is a schematic cross-sectional view of one example of a recording medium according to the present invention.

Hereinbelow, the present invention is described detailed using a figure. FIG. 1 is a schematic cross-sectional view of a recording medium of the present invention, reference numeral 1 indicates a substrate and reference numeral 2 indicates a dye receptive layer.

Examples of the substrate constituting the recording medium according to the present invention include films or papers, for example, various plastic films, such as polyester film, polyethylene film, polypropylene film, polystyrene film, nylon film, vinyl chloride film, and the like or white films in which white pigment or filler has been added to one of these films; examples of papers include papers having cellulose fibers as the main component thereof such as recording paper, art paper, coated paper, and the like, and papers having plastic fibers as the main component thereof such as acrylic paper, polypropylene paper, polyester paper, and the like. These papers or films may be used without being subjected to preprocessing, or where necessary, preprocessing such as washing, etching, corona discharge, activating energy irradiation, dyeing, printing, or the like, may be carried out prior to use. Furthermore, a laminated substrate, in which two or more of the above substrates are laminated together, may also be used. In particular, taking into account the recording medium properties, which include, for example, the quality of the image recorded with respect to the characteristics such as roughness to the touch and occurance of curling, a laminated substrate consisting of a synthetic paper or a plastic film laminated on a regular paper is prefered.

The dye receptive layer 2 contains a dyeable component. In the present invention, polyester resin which is described below is used as the dyeable component. The polyester resin is formed by using diol component containing a diol compound shown in Formula (1) in a range of 5-80 molar % with respect to the total diol component.

Examples of the diol compound shown in the Formula (1) include 1,4-cyclohexane dimethanol, 1,4-cyclohexane diethanol, 1,4-cyclohexane diisopropanol, 1,4-cyclohexane dipropanol, 1,4-cyclohexane dihexanol, 1,4-cyclohexane didodecanol, and the like. However, a compound having a number of carbon atoms of $R_1$ or $R_2$ of three or less is preferable, and 1,4-cyclohexane dimethanol is more preferable. It is possible to use these diol compounds singly or in a mixture of two or more.

The diol compound shown in the Formula (1) should be contained 5–80 molar %, more preferably 40–80 molar % with respect to total diol component. If the amounts of the diol compound shown in the Formula (1) is less than 5 molar % with respect to the total diol component, the effect of an increase in the resistance to light and dark fade out would be insufficient. When the amounts used thereof is more than 80 molar % with respect to the total diol component, it is difficult to prepare the polyester resin, and further, there is a tendency of the prepared polyester resin to be difficult to dissolve in a general organic solvent.

Examples of diol compounds other than the diol compound shown in the Formula (1) include an aliphatic diol such as ethylene glycol, propylene glycol, 1,2-propylene glycol, neopentyl glycol, 1,3-butanediol, 1,4-butanediol, 1,5-pentanediol, 1,6-hexanediol, diethylene glycol, triethylene glycol, polyethylene glycol, polypropylene glycol, polytetramethylene glycol, and the like. However, when a diol having four carbon atoms or more in the main chain, such as 1,4-butanediol, 1,5-pentanediol, 1,6-hexanediol, diethylene glycol, triethylene glycol, polyethylene glycol, polypropylene glycol, polytetramethylene glycol, or the like is used, there is a tendency that a glass transition temperature (Tg) of the polyester resin obtained lowers and a viscosity of the resin increases. Accordingly a recording medium having a dye receptive layer containing a polyester resin formed by using such a diol compound having four carbon atoms or more in the main chain is unpreferable, because it is fused and stuck to a dying layer of a transfer sheet during recording, and an image recorded therefore fades out and blurs after a long storage. Preferable diol to be used is a diol compound shown in Formula (2) below which has three carbon atoms or less in the main chain, for example, ethylene glycol, propylene glycol, 1,2-propylene glycol, neopentyl glycol, 1,3-butanediol, and the like. It is possible to use these diol compounds singly or in a mixture of two or more. It is preferable to contain it in a range of 95–20 molar % with respect to the total diol component.

$$HO-R_3-OH \qquad (2)$$

(In Formula (2), $R_3$ represents an straight-chain or branched alkylene group having three carbon atoms or less in the main chain.)

On the other hand, dicarboxylic acid used for preparation of the above polyester resin is not particularly restricted, and all of dicarboxylic acids which are used in general for a condensation polymerization of polyester can be used. Examples thereof are terephthalic acid, isophthalic acid, sebacic acid, adipic acid, and the like. It is possible to use the dicarboxylic acid singly or in a mixture of two or more.

Additionally, dimethyl terephthalate, dimethyl isophthalate or the like can be used as a material for the condensation polymerization in place of terephthalic acid, isophthalic acid or the like respectively.

In order to obtain the polyester resin for a dye receptive layer according to the present invention, the above-mentioned materials are conducted an esterification reaction or an ester interchange reaction by means of heating them in a reacting vessel equipped with a reflux condenser. At this time, a general catalyst of an esterification or an ester interchange reaction, such as sulfunic acid, titanium butoxide, dibutyltin oxide, magnesium acetate, manganese acetate, or the like, can be added depending on the necessity.

Next, water or alcohol produced by the reaction is removed by conventional method. However, polymerization reaction in the present invention is continued with removing the diol components under evacuated condition of 10 mmHg or less. Additionally, at the polymerization, a conventional polymerization catalyst, such as titanium butoxide, dibutyltin oxide, tin acetate, zinc acetate, tin disulphate, antimony trioxide, germanium dioxide, or the like can be used. The polymerization temterature and the amounts of catalyst are not particularly restricted, they can be selected randomly depending on nessecity.

Thus obtained polyester resin of the present invention has an intrinsic viscosity of preferably 0.3–0.8 (dl/g) and more preferably 0.4–0.6 (dl/g), which is measured at 25° C. in phenol/1,1,2,2-tetrachloroethane mixture solvent (weight ratio=1/1). If the intrinsic viscosity is less than 0.3 (dl/g), repelling would occur at coating process of the dye receptive layer on the substrate resulting in deterioration of external appearance. When the intrinsic viscosity is more than 0.8 (dl/g), coating process becomes to be difficult and uneven coating tends to occur. Additionally, polyester resin for a dye receptive layer in the present invention has a color reproducibility characterized by "b value" which is preferably 20 or less, more preferably 15 or less. The "b value" is defined by a measurement using an apparatus for measurement of difference in color (manufactured by Nippon Denshoku Co.,Ltd. ). If the "b value" is more than 20, image receiving paper prepared by using this resin would have color, there is a tendency that color reproducibility becomes wrong. Furthermore, taking into consideration of a solubility of the polyester resin for a dye receptive layer in the present invention in a solvent and an external appearance of dye receptive layer formed by coating thereof, the polyester resin has an acid value preferably of 3.0 or less (mg KOH/g), and more preferably less than 2.0 or less (mg KOH/g). The acid value is defined by the following manner. At first, 200 g of the resin is dissolved in 10 ml of benzyl alcohol at 180° C. in an Erlenmeyer flask, and after cooling, 10 ml of benzyl alcohol and 20 ml of chloroform are added. Next, the solution is titrated by 1/50N aqueous solution of sodium hydroxide with using Cresol Red as an indicator. If the acid value is more than 3.0, there is a tendency that white precipitate insoluble with solvent would be observed, and external appearance of dye receptive layer obtained becomes wrong.

In the present invention, polyester resin formed by using a diol component containing a diol compound shown in Formula (1) in a range of 5–80 molar % with respect to the total diol component is used as a dyeable component in a dye receptive layer. Accordingly, the resistance to light exposure and dark fade out of the image recorded can greatly improved.

It is possible to use these specified polyester resin singly or in a mixture of two or more, in a range defined above. Additionally, it is permissible to use the specified polyester resin in a mixture with the other polyester resin, which is a polyester resin formed without a diol compound shown in Formula (1) or formed using a diol compound shown in Formula (1) in a range of less than 5 molar %. In that case, the content of the above-defined specified polyester resin should be 50% by weight or more. If the content is less than 50% by weight, objective effect of the present invention would not be obtained.

It is preferable to include a cross-linking component in the dye receptive layer according to the present invention, in order to increase the separability of the dye receptive layer from the transfer sheet. For example, it is possible to include heat curable components such as isocyanate and polyol and the like, and to thermally cross-link these components after the formation of the dye receptive layer, or as disclosed in Japanese Laid-Open Patent Application No. Sho 62-46689 and Japanese Laid-Open Patent Application No. Sho 63-67188, to apply a cross-linking agent curable by means of activating energy rays, for example, a resin composition including monomers or oligomers possessing acryloyloxy groups or methacryloyloxy groups, to the surface of a substrate, and then to cure this by means of activating energy rays, thus yielding an dye receptive layer. In particular, in the case of a method in which components which can be cross-linked by means of activating energy rays are blended, cured by means of activating energy rays, and an dye receptive layer thus obtained, high productivity becomes possible, the surface gloss of the resulting dye receptive layer is high, so that such a method is more preferable.

As the cross-linking agent which can be cured by activating energy rays, monomers or oligomers having acryloyloxy groups or methacryloyloxy groups as polymerizable groups are preferably used.

Examples of the monomer or the oligomer include polyether acrylate or polyether methacrylate (hereinbelow, acrylate and methacrylate are termed as (meth)acrylate), polyester (meth)acrylate, polyol (meth)acrylate, epoxy (meth)acrylate, amidourethane (meth)acrylate, urethane (meth)acrylate, spiroacetal (meth)acrylate, polybutadiene (meth)acrylate, and the like.

More concretely, polyether (meth)acrylate prepared from 1,2,6-hexanetriol/propylene oxide/acrylic acid and trimethylolpropane/propylene oxide/acrylic acid; polyester (meth)acrylate prepared from adipic acid/1,6-hexanediol/acrylic acid and succinic acid/trimethylolethane/acrylic acid; (meth)acrylates or polyol (meth) acrylates such as triethylene glycol diacrylate, hexapropylene glycol diacrylate, neopenthyl glycol diacrylate, 1,4-butanediol dimethacrylate, 2-ethylhexyl acrylate, tetrahydrofurfuryl acrylate, 2-hydroxyethyl methacrylate, ethylcarbitol acrylate, terimethylolpropane triacrylate, pentaerythritol tetraaclylate, dipentaerythritol tetraaclylate, dipentaerythritol pentaacrylate, dipentaerythritol hexaacrylate, tripentaerythritol pentaacrylate, tripentaerythritol hexaacrylate, tripentaerythritol heptaacrylate, 2,2-bis(4-acryloyloxy diethoxyphenyl) propane, 2,2-bis(4-acryloyloxy triethoxyphenyl) propane, 2,2-bis(4-acryloyloxy propoxyphenyl) propane, and the like; epoxy (meth)acrylate such as diglycidyletherified bisphenol A/acrylic acid, diglycidyletherified polybisphenol A/acrylic acid, triglycidyletherified glycerin/acrylic acid, and the like; amidourethane (meth)acrylate such as γ-butyrolactone/N-methylethanolamine/bis(4-isocanatocyclohexyl)methane/2-hydroxyethyl acrylate, γ-butyrolactone/N-methylethanolamine/2,6-tolylene diisocyanate/tetraethylene glycol/2-hydroxyethyl acrylate, and the like; urethane acrylate such as 2,6-tolylene diisocyanate diacrylate, isophorone diisocyanate diacrylate, hexamethylenediisocyanate diacrylate and the like; spiroacetal acrylate prepared from diallylidene pentaerythritol/2-hydroxyethyl acrylate; acrylated polybutadiene prepared from epoxidized butadiene/2-hydroxyethyl acrylate; and the like. These monomers and oligomers are used singly or in a mixture of two or more.

Among the above monomers and oligomers, compounds shown in the following Formula (3), for example, dipentaerythritol tetraacrylate, dipentaerythritol pentaacrylate, dipentaerythritol hexaacrylate, tripentaerythritol pentaacrylate, tripentaerythritol hexaacrylate, tripentaerythritol heptaacrylate, and the like;

[(In the Formula (3), ml is an integer of 1-4, and at least three of X's is a group shown in Formula (3a) respectively and the residue of the X's is an alkyl group having a number of carbon atoms within a range of 1-8, a hydroxyl group, an amino group, or a group shown in Formula (3b), (3c) or (3d).)

$$CH_2=CH-COO-R_4 \quad (3a)$$

(In the Formula (3a), $R_4$ is a single bond, an alkylene group having a number of carbon atoms within a range of 1-8, or a polyoxyalkylen group having alkylen group which has a number of carbon atoms within a range of 1-8.)

(In the Formula (3b), $R_5$ is an alkylene group having a number of carbon atoms within a range of 1-8, m2 is a positive integral number.)

(In the Formula (3c), $R_5$ and m2 are identical to those of Formula (3b).)

(In the Formula (3d), $R_5$ and m2 are identical to those of Formula (3b).)]
or polybisphenol A type polyacrylate shown in Formula (4), for example, diacrylate of diglycidyletherified bisphenol A, diacrylate of Epikote #1001 (m3=3) (produced by Yuka-Shell Epoxy Co., Ltd.);

(In the Formula (4), m3 is an integer of 1-10, Z is independently —OH or —OCOCH=CH$_2$.)
or a compound shown in Formula (5), for example, 2,2-bis(4-acryloyloxydiethoxyphenyl) propane, 2,2-bis(4-acryloyloxytriethoxyphenyl) propane, 2,2-bis (4- acryloyloxypropoxyphenyl propane, and the like; is particularly preferable cross-linking agent which is dryed quickly in the air in the case of using UV-ray as an activating energy ray.

(In the Formula (5), $X_1, X_2, \ldots, X_p$ and $Y_1, Y_2, \ldots, Y_q$ are the same or different alkylene groups having a number of carbon atoms of six or less, or groups one hydrogen atom thereof is substituted, and p and q is an integer of 0–5.)

The amounts of the above polyester resin and cross-linking components which are used are not particularly restricted; however, it is preferable that, with respect to a total amounts of both the polyester resin and the cross-linking components of 100 parts by weight, the polyester resin be present in an amount of 40–95 parts by weight, while the cross-linking components be present in an amount of 60–5 parts by weight.

If the amounts of the polyester resin is less than 40% by weight, it would be difficult to increase dye density of sublimation type dye. When the amounts of the polyester resin is more than 95% by weight, the amounts of cross-linking agent decreases so that there is a tendency that the resistance to blocking to the color sheet coated by sublimation dye is decreases, and sticking between the dye receptive layer and color sheet occurs easily at the time of heat transfer.

The resin composition containing a cross-linking agent curable by means of activating energy rays may be cured by activating energy rays such as an electron beam or ultraviolet radiation; however, in the case in which ultraviolet radiation is used as the activating energy rays, it is desirable to include a conventional photopolymerization initiator. The amounts of photopolymerization initiator which is used is not particularly restricted; however, it is preferable that, with respect to a total amounts of the above-described polyester resin forming the dye receptive layer and cross-linking components of 100 parts by weight, the photopolymerization initiator be present in an amount of 0.1–10 parts by weight.

Furthermore, it is permissible to include a releasing agent in the dye receptive layer according to the present invention in order to further increase the separability of the dye receptive layer from the transfer sheet. Examples of this releasing agent include silicone surfactants, fluorine surfactants, a graft polymer using polyorganosiloxane as a trunk or a branch, silicon or fluorine compounds produciable a cross-linked structure, for example, a combination of amino-denatured silicon and epoxy-denatured silicon, and the like; the releasing agents may be used singly or concurrently. The amount of the releasing agent used is not particularly restricted; however, with respect to a total of 100 parts by weight of polyester resin and cross-linking components, it is preferable that the releasing agent be present in an amount of 0.01–30 parts by weight.

In the present invention, in order to further increase the light resistance Of the dye receptive layer, it is permissible to include an ultraviolet absorber in the resin composition constituting the dye receptive layer. It is possible to use conventional ultraviolet absorbers such as benzotriazole ultraviolet absorbers or benzophenone ultraviolet absorbers, or the like, as these ultraviolet absorbers. Concrete examples of benzotriazole ultraviolet absorbers include, for example, 2-(5-methyl-2-hydroxy phenyl) benzotriazole (manufactured by Ciba-Geigy: TINUVIN P), 2-[2-hydroxy-3,5-bis($\alpha,\alpha$-dimethyl-benzyl) phenyl]-2H-benzotriazole (manufactured by Ciba-Geigy: TINUVIN 234), 2-(5-t-butyl-2-hydroxy phenyl) benzotriazole (manufactured by Ciba-Geigy: TINUVIN PS), 2-(3,5-di-t-butyl-2-hydroxy phenyl) benzotriazole (manufactured by Ciba-Geigy: TINUVIN 320), 2-(3-t-butyl-5-methyl-2-hydroxy phenyl)-5-chlorobenzotriazole (manufactured by Ciba-Geigy: TINUVIN 326), 2-(3,5-di-t-butyl-2-hydroxyphenyl)-5-chlorobenzotriazole (manufactured by Ciba-Geigy: TINUVIN 327), 2-(3,5-di-t-amyl-2-hydroxy phenyl) benzotriazole (manufactured by Ciba-Geigy: TINUVIN 328), 2-[2-hydroxy-3-(3,4,5,6-tetrahydrophthalimide methyl)-5-methyl phenyl] benzotriazole (manufactured by Sumitomo Chemical Company, Limited: SUMISORB 250), 2-(4-octoxy-2-hydroxyphenyl) benzotriazole, and the like. Concrete examples of the benzophenone ultraviolet absorber include, for example, 2,4-dihydroxybenzophenone, 2-hydroxy-4-methoxy benzophenone, 2-hydroxy-4-octoxybenzophenone, 2-hydroxy-4-dodecyloxybenzophenone, 2-hydroxy-4-benzyloxybenzophenone, 2,2'-dihydroxy-4-methoxy benzophenone, 2,2',4,4'-tetrahydroxy benzophenone, 2,2'-dihydroxy-4,4'-dimethoxybenzophenone, 2,2'-dihydroxy-4,4'-dioctoxy benzophenone, 2,2'-dihydroxy-4,4'-didodecyloxy benzophenone, 2-hydroxy-4-methoxy-5-sulfobenzophenone, and the like.

These ultraviolet absorbers may be used singly or in a mixture of two or more thereof. The amounts used thereof are not particularly restricted; however, with respect to a total of 100 parts by weight of polyester resin and cross-linking components, the ultraviolet absorber may be preferably present in an amount of 1–10 parts by weight. If the amount used is too small, the effect of an increase in light resistance is insufficient, while when the amount used is too great, the ultraviolet absorber bleeds onto the surface of the dye receptive layer, and the recorded image tends to blur over time.

Furthermore, in order to further increase the light resistance of the dye receptive layer, it is acceptable to include a hindered amine photostabilizer. Conventional hindered amine photostabilizers may be used; concrete examples thereof include, for example, bis(2,2,6,6-tetramethyl-4-piperidyl) sebacate (manufactured by Sankyo Company, Limited: SANOL LS770), bis(1,2,2,6,6-pentamethyl-4-piperidyl) sebacate (manufactured by Sankyo Company, Limited: SANOL LS765), 1-{2-[3-(3,5-di-t-butyl-4-hydroxy phenyl) propionyloxy] ethyl}-4-[3-(3,5-di-t-butyl-4-hydroxy phenyl) propionyloxy]-2,2,6,6-tetramethyl piperidine (manufactured by Sankyo Company, Limited: SANOL LS2626), 4-benzoyloxy-2,2,6,6-tetramethyl piperidine (manufactured by Sankyo Company, Limited: SANOL LS744), 8-acetyl-3-dodecyl-7,7,9,9-tetramethyl-1,3,8-triaza-spiro [4,5] decane-2,4-dione (manufactured by Sankyo Company, Limited: SANOL LS440), 2-(3,5-di-t-butyl-4-hydroxy benzyl)-2-n-butylmalonate bis(1,2,2,6,6-pentamethyl-4-piperidyl) (manufactured by Ciba-Geigy: TINUVIN 144), succinate bis(2,2,6,6-tetramethyl-4-piperidinyl) ester (manufactured by Ciba-Geigy: TINUVIN 780 FF), a condensation polymer of dimethyl succinate and 1-(2-hydroxy ethyl)-4-hydroxy-2,2,6,6-tetramethyl piperidine (manufactured by Ciba-Geigy: TINUVIN 622 LD), poly{[6-(1,1,3,3-tetramethylbutyl) amino-1,3,5-triazine-2,4-dyl] [(2,2,6 6-tetramethyl-4-piperidyl) imino] hexamethylene [(2,2,6,6-tetramethyl-4-piperidyl) imino]} (manufactured by Ciba-Geigy: CHIMASSORB 944LD), a condensation polymer of N,N'-bis (3-aminopropyl) ethylene diamine and 2,4-bis [N-butyl-N-(1,2,2,6-pentamethyl-4-piperidyl) amino]-6-chloro-1,3,5-triazine (manufactured by Ciba-Geigy: CHIMASSORB 119FL), HA-70G (manufactured by Sankyo Company, Limited), ADK STAB LA-52, ADK STAB LA-57, ADK STAB LA-62, ADK STAB LA-67, ADK STAB LA-63, ADK STAB LA-68, ADK STAB LA-82, ADK STAB LA-87 (all produced by Asahi Denka Kogyo K.K.), and the like.

These hindered amine photostabilizers may be used singly or in a mixture of two or more; however, when the effect of an increase in light resistance is taken into account, it is preferable that they be used in concert with the above-described ultraviolet absorbers. The amount used of these hindered amine photostabilizers is not particularly restricted; however, with respect to a total of 100 parts by weight of polyester resin and cross-linking components, it is preferable that the hindered amine photostabilizer be present in an amount of 0.1–10 parts by weight. If the amount used is too small, the effect of an increase in light resistance may not be sufficiently attained, while on the other hand, when the amount used is too large, the hindered amine photostabilizer tends to bleed out onto the surface of the dye receptive layer, and thus the recorded image tends to blur over time.

Furthermore, in order to further increase the light resistance of the dye receptive layer, it is acceptable to include an antioxidant. As the antioxidant, conventional phenol antioxidant, amine antioxidant, sulfur antioxidant or phosphate antioxidant may be used. These antioxidant may be used singly or in a mixture of two or more. The amount used of these antioxidants is not particularly restricted; however, with respect to a total of 100 parts by weight of polyester resin and cross-linking components, it is preferable that the antioxidant be present in an amount of 0.1–20 parts by weight. If the amount used is too small, the effect of an increase in light resistance will not be sufficiently attained, while on the other hand, when the amount used is too large, the antioxidant tends to bleed out onto the surface of the dye receptive layer, and thus the recorded image tends to blur over time.

Furthermore, it is permissible to contain thermoplastic resin other than the polyester resin in the dye receptive layer of recording medium of the present invention, depending on the purpose. Examples of the thermoplastic resin include a cellulose resin such as methyl cellulose, ethyl cellulose, ethyl hydroxy cellulose, hydroxy ethyl cellulose, hydroxy propyl cellulose, cellulose acetate, and the like, or a vinyl resin such as polyvinyl alcohol, polyvinyl butyral, polyvinyl acetal, polyvinyl acetate, polyvinyl chloride, polyvinyl pyrrolidone, styrene, and the like, an acrylate resin such as polymethyl (meth)acrylate, polybutyl (meth)acrylate, polyacrylamide, polyacrylonitrile, and the like, a polycarbonate resin, a polyurethane resin, a polyamide resin, an urea resin, polycaprolacton resin, a polyallylate resin, polysulfone resin and a copolymer or a mixture thereof.

When the object of the present invention is taken into account, it is preferable that the amount of the thermoplastic resin other than the polyester resin to be used does not exceed the amount of the object the above-specified polyester resin.

Furthermore, depending on the purpose of use, inorganic fillers such as silica, calcium carbonate, titanium oxide, zinc oxide, and the like, may be included in the dye receptive layer.

In manufacturing the recording medium of the present invention, the resin composition may be applied directly to a substrate surface by means of a coating method such as roll coating, bar coating, blade coating, or the like, and the dye receptive layer can thus be formed. However, in order to increase the efficiency of the application process, the resin composition may be blended with a solvent able to dissolve the resin composition, such as, for example, ethyl alcohol, methyl ethyl ketone, toluene, ethyl acetate, dimethylformamide, tetrahydrofuran, and the like, and appropriate adjustment of the application viscosity may be carried out. By means of this, application may easily be conducted by means of spray coating, curtain coating, flow coating, dip coating, or the like. In the case in which such solvents are blended with the resin composition, the solvents must be volatilized and dried after the coating of the resin composition.

The dye receptive layer preferably have a thickness of 0.5–100 micrometers, and more preferably within a range of 1–50 micrometers. At a thickness of less than 0.5 micrometers, the high recording density will not be obtained.

Furthermore, the recording medium according to the present invention may have a layer such as an adhesion facilitating layer, an electrostatic prevention layer, a whiteness improving layer, or a compound layer combining these functions provided between the image receiving layer and the substrate. In addition, in this recording medium according to the present invention, processing such as electrostatic prevention processing, contaminant protection processing, smoothing processing, and writing facilitation processing may be carried out on the side opposite the dye receptive layer.

EXAMPLES

Hereinbelow, the present invention will be explained in detail based on examples.

Example
MANUFACTURATION OF SUBSTRATE

On one side of a sheet of art paper (thickness 85 micrometers), a white polyester film (manufactured by Diafoil Hoechst: W900, thickness 38 micrometers) was laminated, and on the other side of this paper, a sheet of white polypropylene paper (manufactured by Toyobo: TOYOPEARL SS, thickness 50 micrometers) was laminated. The AD-577-1 and the CAT-52 adhesives produced by Toyo Morton Co., Ltd. were used as the adhesives therefor. The amount of the adhesives was 5 g/m$^2$ in dry between the white polyester film and coat paper, and 3 g/m$^2$ in dry between the coat paper and white polypropylene paper. After drying at 80° C. for about 30 second, the substrate was aged at 40° C. for two days.

PREPARATION OF POLYESTER RESIN

| Dicarboxyric components | |
|---|---|
| Terephthalic acid | 40 molar parts |
| Isophthalic acid | 60 molar parts |
| Diol components | |
| Ethylene glycol | 18 molar parts |
| Neopentyl glycol | 42 molar parts |
| 1,4-cyclohexanedimethanol | 60 molar parts |

The above materials were poured into a reacting vessel equipped with a reflux condenser, and the inside of the vessel was heated to 130° C. After that, the temperature was raised gradually to 260° C., so that the diol components and the dicarboxyric components react at this condition. Next, zinc acetate in an amount of 300 ppm with respect to the dicarboxylic components, antimony trioxide in an amount of 400 ppm with respect to the dicarboxyric components were added, and polymerization reaction was continued with romoving excessive diol, resulting in preparation of the polyester resin.

Thus obtained polyester resin has a molar ratio of terephtaric acid component/isophtaric acid component is 40/60, and ethylene glycol component/neopentyl glycol component/1,4-cyclohexanedimethanol is 14/32/54. This polyester resin is termed polyester resin G, and the other resins (polyester resin A-J) having compositions listed in table 3 was prepared. Additionally, intrinsic viscosity in the table 3 is measured by the method described in this specification.

FORMING OF DYE RECEPTIVE LAYER

The coating fluid for the dye receptive layer within the resin composition shown in the table 1 and 2 was coated uniformly to the surface of the substrate above, by means of an immersion method, and after the volatilization of the solvent, this was irradiated with ultraviolet rays by means of a high pressure mercury lamp, and an dye receptive layer having a thickness of 5-6 micrometers was formed, so that a recording medium was obtained (Examples 1-9, Comparative Examples 1-3). In Example 10, this was heated at 100° C. for two hours, and an dye receptive layer having a thickness of 5-6 μm was formed, so that a recording medium was obtained. In the table 1 and 2,

*1) Polyester resin having a composition listed in table 3.
*2) 2P6A: dipentaerythritol hexaacrylate.
*3) 2P5A: dipentaerythritol pentaacrylate.
*4) 2P4A: dipentaerythritol tetraacrylate.
*5) A-DEP: 2,2-bis (4-acryloyloxydiethoxyphenyl) propane.
*6) KF-393: amino-denaturated silicone oil (Shin-Etsu Chemical Co., Ltd.)
*7) X-22-343: epoxy-denaturated silicone oil (Shin-Etsu Chemical Co., Ltd.)
*8) Silicone surfactant A; shown in the following Formula.

(In the Formula, 1,m and x is an integer, and $(21+m+1)/tax=1.3$)
*9) Antioxidant A; shown in the following Formula.

(The each recording medium which was thus obtained in Example 1-10 or Comparative Example 1-3 was tested about the resistance to light exposure and the resistance to dark fade out. The resurts of them is shown in table 1 and 2. And the methods of testing the above properties are described below.)
*10) Resistance to light exposure:

Recording was conducted using the cyan color and the magenta color of the color sheet VW-VS 100 for the NV-MP1 video printer produced by Matsushita Electric Industrial Co., Ltd. and the cyan color of the color sheet CK-10S for the CP-10 video printer produced by Mitsubishi Electric Industrial Co., Ltd., and using a thermal head produced by Kyocera Corporation (950 Ohms, 6 dots/mm) and under conditions such that the recording voltage was 13 V, and the pulse width was 10 msec. Subsequently, the recorded image was exposed for a period of 72 hours using a xenon long life fade meter (produced by Suga Test Instruments Co., Ltd.: model FAL-25AX) and the color variation ($\Delta E$) before and after exposure was measured.
*11) Resistance to dark fade out:

Recording was conducted by means of thermal head (950 ohms, 6 dots/mm) produced by Kyocera Corporation and using the cyan color of a VW-VS 100 color sheet for use in an NV-MP 1 video printer produced by Matsushita Electric Industrial Co., Ltd., under conditions such that the recording voltage was 15 V, and the pulse width was 10 msec. Subsequently, the recorded image was stored in a darkened area for a period of 7 days at a temperature of 60° C. and at a humidity of 60%; the reflection density of the image before and after storage was measured using a Macbeth densitometer (status A filter). This dark fade out is estimated by the following expression.

$$\text{dark fade out } (\%) = \frac{\text{(post-strage reflection density)}}{\text{(pre-strage reflection density)}} \times 100$$

*12) After recording an image, the dye receptive layer sticked to a transfer sheet in a little part, so that a part of dye layer of the transfer sheet was flayed and moved to the dye receptive layer.

As is clear from tables 1 and 2, the recording medium of Examples 1-10, which uses the polyester resin formed by using a diol component containing a diol compound shown in Formula (1) in a range of 5-80 molar % with respect to a total diol component, has superior resistance to light exposure and dark fade out. Especially, the recording medium of Examples 5-8, in which the diol compound is contained in a range of 40 molar % or more with respect to a total diol component, has further superior resistance to light exposure and dark fade out. Additionally, the recording medium of Examples 1-8 in which the polyester resin is constituted of diol compound shown in Formula (1) and diol compound shown in Formula (2), has good releasability to transfer sheet and resistance to dark fade out, comparing to the recording medium of Example 9, in which the diol component contains a diol compound having four carbon atoms or more in the main chain.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| composition of coating fluid for a dye receptive layer | | | | | | | | | | | |
| polyester resin*1) | resin A | | | 20 | | | | | 20 | | |
| | resin B | 70 | | | | | | | | | |
| | resin C | 70 | | | | | | | | | |
| | resin D | | 70 | 50 | | | | | | | |
| | resin E | | | | 70 | | | | | | 86 |
| | resin F | | | | | 70 | | | | | |
| | resin G | | | | | | 70 | | | | |
| | resin H | | | | | | | 70 | | | |
| | resin I | | | | | | | | 70 | | |
| | resin J | | | | | | | | | 70 | |
| cross-linking agent | 2P6A *2) | 4.5 | 4.5 | 4.5 | 4.5 | 4.5 | 4.5 | 4.5 | 4.5 | 4.5 | |
| | 2P5A *3) | 6 | 6 | 6 | 6 | 6 | 6 | 6 | 6 | 6 | |
| | 2P4A *4) | 4.5 | 4.5 | 4.5 | 4.5 | 4.5 | 4.5 | 4.5 | 4.5 | 4.5 | |
| | A-DEP *5) | 15 | 15 | 15 | 15 | 15 | 15 | 15 | 15 | 15 | |
| | KF-393 *6) | | | | | | | | | | 7 |
| | X-22-343 *7) | | | | | | | | | | 7 |
| photopolymerization initiator a) | | 4 | 4 | 4 | 4 | 4 | 4 | 4 | 4 | 4 | |
| silicone surfactant *8) | | 0.5 | 0.5 | 0.5 | 0.5 | 0.5 | 0.5 | 0.5 | 0.5 | 0.5 | |
| UV absorber b) | | 5 | 5 | 5 | 5 | 5 | 5 | 5 | 5 | 5 | |
| photostabilizer c) | | 5 | 5 | 5 | 5 | 5 | 5 | 5 | 5 | 5 | |
| antioxidant A *9) | | | | | | | | | | | 10 |
| solvent | methyl ethyl ketone | 500 | 500 | 500 | 500 | 500 | 100 | 100 | 500 | 500 | 300 |
| | toluene | 100 | 100 | 100 | 100 | 100 | 500 | 500 | 100 | 100 | 300 |
| resistance to light exposure *10) | CK-10S | 22 | 20 | 24 | 19 | 16 | 15 | 14 | 17 | 25 | 17 |
| | VW-VS100 | 23 | 22 | 23 | 20 | 17 | 14 | 13 | 17 | 26 *12) | 13 |
| resistance to dark fade out (%) *11) | | 90 | 91 | 90 | 92 | 93 | 94 | 95 | 93 | 85 *12) | 87 | a) 1-hydroxycyclohexylphenylketone
b) 2-hydroxy-4-n-octoxybenzophenone
c) bis-(1,2,2,6,6-pentamethyl-4-pyperidyl) cebacate

TABLE 2

| | | Comparative Example 1 | Comparative Example 2 | Comparative Example 3 |
|---|---|---|---|---|
| composition of coating fluid for a dye receptive layer | | | | |
| polyester resin *1) | resin A | 70 | | 50 |
| | resin B | | 70 | |
| | resin C | | | |
| | resin D | | | 20 |
| | resin E | | | |
| | resin F | | | |
| | resin G | | | |
| | resin H | | | |
| | resin I | | | |
| | resin J | | | |
| cross-linking agent | 2P6A *2) | 4.5 | 4.5 | 4.5 |
| | 2P5A *3) | 6 | 6 | 6 |
| | 2P4A *4) | 4.5 | 4.5 | 4.5 |
| | A-DEP *5) | 15 | 15 | 15 |
| | KF-393 *6) | | | |
| | X-22-343 *7) | | | |
| photopolymerization initiator a) | | 4 | 4 | 4 |
| silicone surfactant *8) | | 0.5 | 0.5 | 0.5 |
| UV absorber b) | | 5 | 5 | 5 |
| photostabilizer c) | | 5 | 5 | 5 |
| antioxidant A *9) | | | | |
| solvent | methyl ethyl ketone | 500 | 500 | 500 |
| | toluene | 100 | 100 | 100 |
| resistance to light exposure *10) | CK-10S | 36 | 31 | 31 |
| | VW-VS100 | 25 | 24 | 24 |
| resistance to dark fade out (%) *11) | | 85 | 87 | 87 | a) 1-hydroxycyclohexylphenylketone
b) 2-hydroxy-4-n-octoxybenzophenone
c) bis-(1,2,2,6,6-pentamethyl-4-pyperidyl) cebacate

TABLE 3

| | composition (molar ratio) | | | | | | | | | |
|---|---|---|---|---|---|---|---|---|---|---|
| | carboxyric acid | | glycol | | | | | molecular weight | Tg (°C.) | intrinsic viscosity [η] |
| | terephtaric acid | isophtaric acid | ethylene glycol | neopentyl glycol | 1,4-cyclohexane dimethanol | 1,4-cyclohexane diethanol | 1,6-hexane diol | | | |
| A | 50 | 50 | 50 | 50 | — | — | — | 15000–20000 | 67 | 0.53 |
| B | 40 | 60 | 30 | 67 | 3 | — | — | 30000–35000 | 59 | 0.52 |
| C | 40 | 60 | 27 | 66 | 7 | — | — | 25000–30000 | 60 | 0.44 |
| D | 60 | 40 | 22 | 56 | 22 | — | — | 30000–35000 | 64 | 0.55 |

TABLE 3-continued

| | composition (molar ratio) | | | | | | | | | |
|---|---|---|---|---|---|---|---|---|---|---|
| | carboxyric acid | | glycol | | | | | molecular weight | Tg (°C.) | intrinsic viscosity [η] |
| | terephtaric acid | isophtaric acid | ethylene glycol | neopentyl glycol | 1,4-cyclohexane dimethanol | 1,4-cyclohexane diethanol | 1,6-hexane diol | | | |
| E | 40 | 60 | 21 | 48 | 31 | — | — | 25000–30000 | 65 | 0.48 |
| F | 40 | 60 | 18 | 40 | 42 | — | — | 25000–30000 | 67 | 0.50 |
| G | 40 | 60 | 14 | 32 | 54 | — | — | 25000–30000 | 70 | 0.52 |
| H | 30 | 70 | 10 | 20 | 70 | — | — | 20000–25000 | 71 | 0.46 |
| I | 40 | 60 | 18 | 40 | — | 42 | — | 25000–30000 | 63 | 0.50 |
| J | 40 | 60 | 20 | 46 | 20 | — | 14 | 25000–30000 | 49 | 0.45 |

What is claimed is:

1. A polyester resin, formed from:
   a dicarboxylic acid selected from the group consisting of terephthalic acid, isophthalic acid and mixtures thereof;
   a diol of the formula (I):

$$HO-R_1-\bigcirc-R_2-OH \quad (I)$$

wherein each of $R_1$ and $R_2$ represents an alkylene group having from one to twelve carbon atoms; and
   a cross-linking agent having an acryloyloxy group or a methacryloyloxy group which is cured by an activating energy ray.

2. A recording medium for a sublimation-type heat-sensitive transfer recording process, comprising:
   a substrate, and
   a dye receptive layer comprising the polyester resin of claim 1.

3. A polyester resin, formed from:
   a dicarboxylic acid selected from the group consisting of terephthalic acid, isophthalic acid and mixtures thereof;
   a diol component comprising 40–80 molar % with respect to the total diol component of a diol of the formula (I):

$$HO-R_1-\bigcirc-R_2-OH \quad (I)$$

wherein each of $R_1$ and $R_2$ represents a alkylene group having from one to twelve carbon atoms; and
   a cross-linking agent having an acryloyloxy group or a methacryloyloxy group which is cured by an activating energy ray.

4. The polyester resin of claim 1, wherein said diol is selected from the group consisting of 1,4-cyclohexanedimethanol, 1,4-cyclohexanediethanol, 1,4-cyclohexanediisopropanol, 1,4-cyclohexanedipropanol, 1,4-cyclohexanedihexanol, and 1,4-cyclohexanedidodecanol.

5. The polyester resin of claim 4, wherein said diol is 1,4-cyclohexanedimethanol.

6. A polyester resin, formed from:
   a dicarboxylic acid selected from the group consisting of terephthalic acid, isophthalic acid and mixtures thereof;
   a diol component comprising 5–80 molar % with respect to the total diol component of a diol of the formula I):

$$HO-R_1-\bigcirc-R_2-OH \quad (I)$$

wherein each of $R_1$ and $R_2$ represents an alkylene group having from one to twelve carbon atoms, and 95–20 molar % with respect to the total diol component of a diol of the formula (II):

$$HO-R_3-OH \quad (II)$$

wherein $R_3$ represents a straight-chain alkylene group having form 1 to 3 carbon atoms, which may be substituted with one or two methyl groups; and
   a cross-linking agent having an acryloyloxy group or a methacryloyloxy group which is cured by an activating energy ray.

7. The polyester resin of claim 1, having an intrinsic viscosity of 0.3–0.8 dl/g, measured at 25° C. in a 1/1 phenol/1,1,2,2-tetrachloroethane mixture.

8. The polyester resin of claim 7, wherein said intrinsic viscosity is 0.4–0.6 dl/g.

9. The polyester resin of claim 1, wherein said cross-linking agent is a polyether acrylate, a polyester (meth)acrylate, a polyol (meth)acrylate, an epoxy (meth)acrylate, an amidourethane (meth)acrylate, a urethane (meth)acrylate, a spiroacetal (meth)acrylate or a polybutadiene (meth)acrylate.

10. The polyester resin of claim 1, wherein said cross-linking agent is a compound of the formula (III):

$$X-CH_2-\underset{\underset{X}{\overset{CH_2}{|}}}{\overset{\overset{X}{|}}{\underset{|}{C}}}-CH_2(-O-CH_2-\underset{\underset{X}{\overset{CH_2}{|}}}{\overset{\overset{X}{|}}{\underset{|}{C}}}-CH_2)_{\overline{m1}}X \quad (III)$$

wherein m1 is an integer of 1–4, and at least three of the X groups are a group of the formula (IIIa):

$$CH_2=CH-COO-R_4- \quad \text{(IIIa)}$$

wherein $R_4$ is a single bond or an alkylene group having from 1 to 8 carbon atoms, and the remainder of the X groups are selected from the group consisting of a hydroxyl group, an amino group, and groups of the formulas (IIIb) and (IIId):

$$-(OR_5)_{m2}-H \quad \text{(IIIb)}$$

$$-(OCOR_5)_{m2}-H \quad \text{(IIId)}$$

wherein $R_5$ is an alkylene group having from 1 to 8 carbon atoms and m2 is a positive integer.

11. A recording medium for a sublimation-type heat-sensitive transfer recording process, comprising:
a substrate, and
a dye receptive layer comprising the polyester resin of claim 3.

12. The recording medium of claim 2, wherein said diol of said polyester resin is selected from the group consisting of 1,4-cyclohexanedimethanol, 1,4-cyclohexanediethanol, 1,4-cyclohexanediisopropanol, 1,4-cyclohexanedipropanol, 1,4-cyclohexanedihexanol, and 1,4-cyclohexanedidodecanol.

13. The recording medium of claim 12, wherein said diol is 1,4-cyclohexanedimethanol.

14. A recording medium for a sublimation-type heat-sensitive transfer recording process, comprising:
a substrate, and
a dye receptive layer comprising the polyester resin of claim 6.

15. The recording medium of claim 2, wherein said polyester resin has an intrinsic viscosity of 0.3–0.8 dl/g, measured at 25° C. in a 1/1 phenol/1,1,2,2-tetrachloroethane mixture.

16. The recording medium of claim 15, wherein said intrinsic viscosity is 0.4–0.6 dl/g.

17. The recording medium of claim 2, wherein said cross-linking agent is a polyether acrylate, a polyester (meth) acrylate, a polyol (meth) acrylate, an epoxy (meth)acrylate, an amidourethane (meth)acrylate, a urethane (meth)acrylate, a spiroacetal (meth)acrylate or a polybutadiene (meth)acrylate.

18. The polyester resin of claim 1, wherein said cross-linking agent has an acryloyloxy group.

19. The polyester resin of claim 1, wherein said cross-linking agent has a methacryloyloxy group.

20. The recording medium of claim 2, wherein said polyester resin contains an acryloyloxy group.

21. The recording medium of claim 2, wherein said polyester resin contains a methacryloyloxy group.

* * * * *